United States Patent [19]

Spencer

[11] Patent Number: 5,386,312
[45] Date of Patent: Jan. 31, 1995

[54] COLLIMATING LENS HAVING DOUBLET ELEMENT BETWEEN POSITIVE-POWER ELEMENTS

[75] Inventor: Harvey M. Spencer, Torrance, Calif.

[73] Assignee: Hughes Aircraft Company, Los Angeles, Calif.

[21] Appl. No.: 923,759

[22] Filed: Aug. 3, 1992

[51] Int. Cl.$^6$ .............. G02B 9/12; G02B 11/10; G02B 13/22; G02B 26/10

[52] U.S. Cl. .................. 359/215; 359/641; 359/663; 359/738; 359/784; 359/792

[58] Field of Search .............. 359/205, 210, 215, 641, 359/663, 738, 764, 767, 769, 784, 789, 790, 792

[56] References Cited

U.S. PATENT DOCUMENTS

| | | | |
|---|---|---|---|
| 2,012,822 | 8/1935 | Lee | 359/769 |
| 2,417,330 | 3/1947 | Strang | 359/792 X |
| 2,651,970 | 9/1953 | Tiller | 359/663 X |
| 3,565,511 | 2/1971 | Dilworth | 359/663 |
| 4,909,619 | 3/1990 | Arai | 359/876 |
| 4,913,540 | 4/1990 | Minefuji | 359/663 |
| 5,050,974 | 9/1991 | Takasugi et al. | 359/663 X |
| 5,055,663 | 10/1991 | Morimoto et al. | 250/201.4 |
| 5,087,987 | 2/1992 | Simbal | 359/663 |
| 5,157,553 | 10/1992 | Phillips et al. | 359/407 X |

FOREIGN PATENT DOCUMENTS 2729832 1/1979 Germany .
3108018 12/1981 Germany .

*Primary Examiner*—Anita Pellman Gross
*Assistant Examiner*—David R. Parsons
*Attorney, Agent, or Firm*—Hugh P. Gortler; M. W. Sales; W. K. Denson-Low

[57] ABSTRACT

A collimating lens (10) is constructed of a lens assembly having a first lens set (12, 14) at a first end of the assembly and a second lens set (20) at a second end of the assembly with a doublet (16, 18) disposed between the first lens set and the second lens set. The first lens set includes a plurality of lens elements (12, 14) each of which has positive optical power. The second lens set has a single lens element (26) of positive optical power and a concave surface (40) facing subject matter to be viewed by the collimating lens. The doublet lens element includes a lens element (16) constructed of flint glass and having a negative optical power plus a lens element (18) constructed of crown glass and having a positive optical power. In the doublet lens element, the negative power lens element has two concave surfaces, the positive-power lens element has two convex surfaces, and the two lens elements are cemented together to provide for a broad-band chromatic correction. The second end of the optical assembly of the lens is characterized by a telecentric entrance pupil for the viewing of a radiant subject. An external aperture stop (50) is provided in front of the first end of the optical assembly at a distance of at least one focal length from the first lens element of the collimating lens. This provides for more efficient collection of light and a wider field of view.

17 Claims, 2 Drawing Sheets

COLLIMATING LENS HAVING DOUBLET ELEMENT BETWEEN POSITIVE-POWER ELEMENTS

BACKGROUND OF THE INVENTION

This invention relates to a collimating lens with an external aperture stop and, more particularly, to a collimating lens having a doublet element of both crown and flint glasses disposed between front and back positive-power lens elements for increased field of view and reduced chromatic aberrations.

Collimating lenses are used in numerous situations, one situation of interest being in an optical apparatus for scanning a display, such as a display formed of light-emitting diodes. An image of a subject on the display is transmitted via a scanning mirror, or drum, to an objective lens for a viewing of the subject by a person. Existing collimating lenses perform the foregoing function, but at a cost. One aspect of the cost is that the light collection ability is less than that which would be desired. A further aspect of the cost is that the overall physical size of the collimating lens is larger than that which would be desired. Another disadvantage in existing collimating lenses in such scanning apparatus is the sensitivity of the lens characteristics to fabrication and alignment errors attendant the construction of such a visual display system. Also, prior art lenses of the foregoing type have had limited spectral bandwidth such that, upon a change in the light emission spectrum of the display, a further design of the collimating lens has been required. As an example of sensitivity to fabrication, it is noted that a typical construction of a collimating lens of the prior art has employed a field lens element which is closely positioned to the display being viewed. The close proximity to the display is attained by building the concave field lens as part of a composite structure including the display. Thus, it becomes necessary during fabrication of the display system to align the field lens element with the other elements of the collimating lens. It is difficult to maintain optical integrity of a lens, or lens assembly, wherein elements of the lens are mounted mechanically in different parts of the system, rather than as portions of a unitary optical assembly.

SUMMARY OF THE INVENTION

The aforementioned problems are overcome and other advantages are provided by a telecentric collimating lens, or lens assembly, constructed in accordance with the present invention. The collimating lens comprise a doublet element of glasses of different indices of refraction along with a front positive lens element and a back positive lens element.

This assembly of lens elements eliminates the need for a field lens. When being used to view a display, the collimating lens can be spaced apart a sufficient distance from the display so as to permit manufacture of the display completely separate from the structure of the collimating lens. The use of a doublet element comprising a concave lens element cemented to a convex lens element provides for increased chromatic correction of the collimating lens, thereby allowing use of the collimating lens over a wider spectral band. The configuration of the collimating lens also provides for increased efficiency of light collection as well as an enlarged viewing angle. Additionally, the collimating lens has a more compact configuration than lenses of the prior art which have been employed for scanning a display.

BRIEF DESCRIPTION OF THE DRAWING

The aforementioned aspects and other features of the present invention are explained in the following description, taken in connection with the accompanying drawings, wherein.

DETAILED DESCRIPTION

Figure 1:
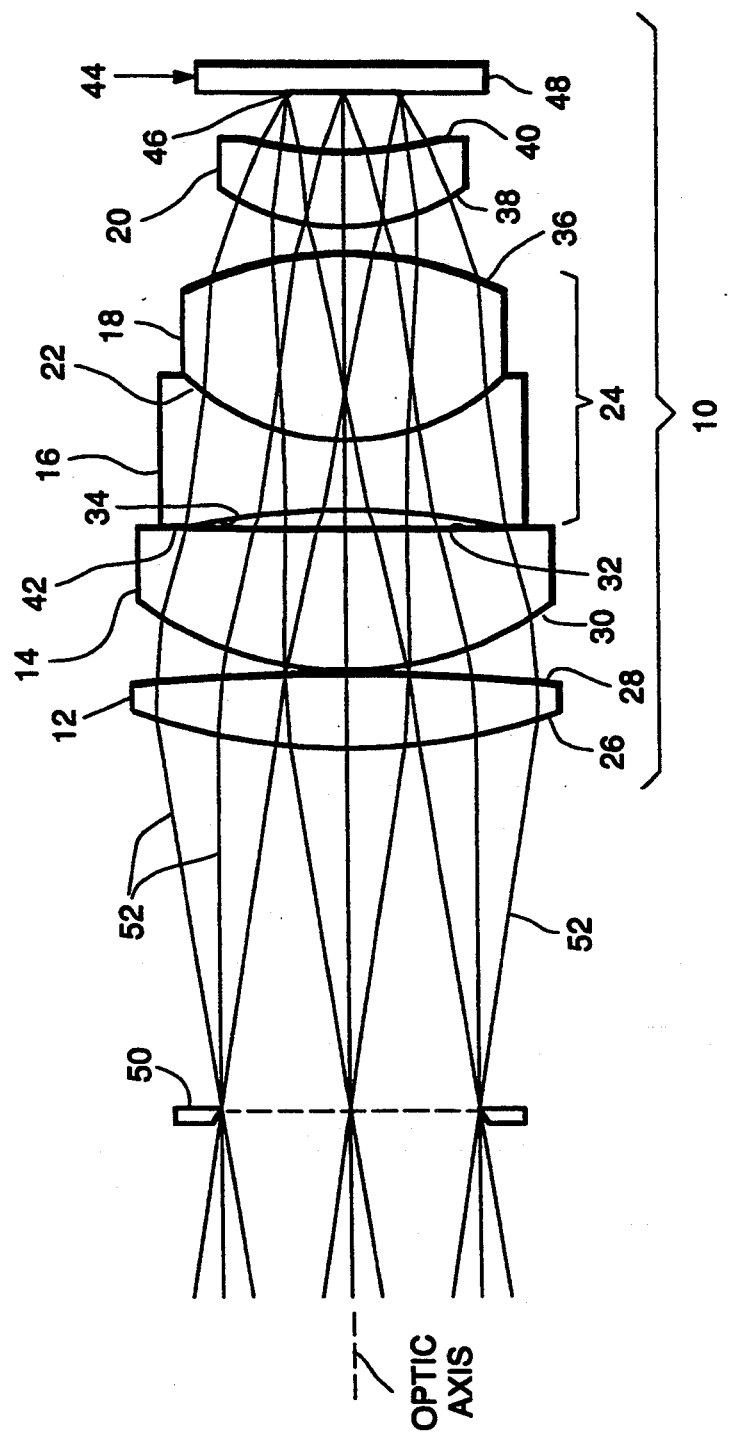
FIG. 1 is a diagrammatic side view of the collimating lens of the present invention showing rays of light propagating through the lens.

With reference to FIG. 1, a collimating lens 10 of the present invention comprises an assembly of lens elements including a first lens element 12, a second lens element 14, a third lens element 16, a fourth lens element 18 and a fifth lens element 20. The third lens element 16 and the fourth lens element 18 are cemented together along an interfacing surface 22 to provide a doublet lens element 24. The first, second, fourth and fifth lens elements 12, 14, 18 and 20 have positive optical power, and are fabricated of crown glass. The third lens element 16, made of flint glass, has negative optical power.

Measurements for a preferred embodiment of the collimating lens 10 are provided in the Table below.

TABLE

| LENS ELEMENT | Index of Refraction | Radius of Curvature* | | Thickness of Lens ++ |
|---|---|---|---|---|
| | | Left Surface | Right Surface | |
| 12 | 1.59 | (26) 0.89276 | −2.95087 (28) | 0.100000 |
| 14 | 1.59 | (30) 0.47813 | 11.21984 (32) | 0.195313 |
| 16 | 1.71 | (34) −1.02827 | 0.32185 (22) | 0.096145 |
| 18 | 1.511 | (22) 0.32185 | −0.50353 (36) | 0.253660 |
| 20 | 1.59 | (38) 0.29803 | 0.53900 (40) | 0.100000 |

*Positive curvatures have centers to the right as viewed in FIG. 1.
Negative curvatures have centers to the left as viewed in FIG. 1.
Reference numerals in parentheses correspond to surfaces of the lens elements.
++ Thicknesses are measured along the central optical axis.

All surfaces are spherical to facilitate manufacture of the collimating lens 10. The diameter of the first lens element 12 is 0.57 inches. The spacings between the lenses are measured along the central optical axis. The spacing between the first lens element 12 and the second lens 14 element is 0.005000 inches. The third lens element 16 abuts against the second lens element 14 at an annular optical flat 42 located outside of the active region of the third lens element 16. The spacing between the second and third lens elements 14 and 16 is 0.026696 inches. The spacing between the fourth and fifth lens elements is 0.038876 inches.

The collimating lens 10 is employed, by way of example, with a display 44 comprising an array of light-emitting diodes (LEDs) 46 supported by a substrate 48. The center of the array of LEDs 46 is located at a distance of 0.081825 inches from the right surface 40 of the fifth lens element 20, as measured along the central axis of the collimating lens 10. The focal length of the collimating lens 10 is 0.500000 inches, this being the minimum distance between the left surface 26 of the first lens element 12 and an optical stop 50. Numerous rays 52 of light emanate from the LEDs 46 and propagate through the collimating lens 10 towards the stop 50. The rays 52, emanating from any one of the LEDs 46, are parallel to each other in the region of the stop 50.

Figure 2:
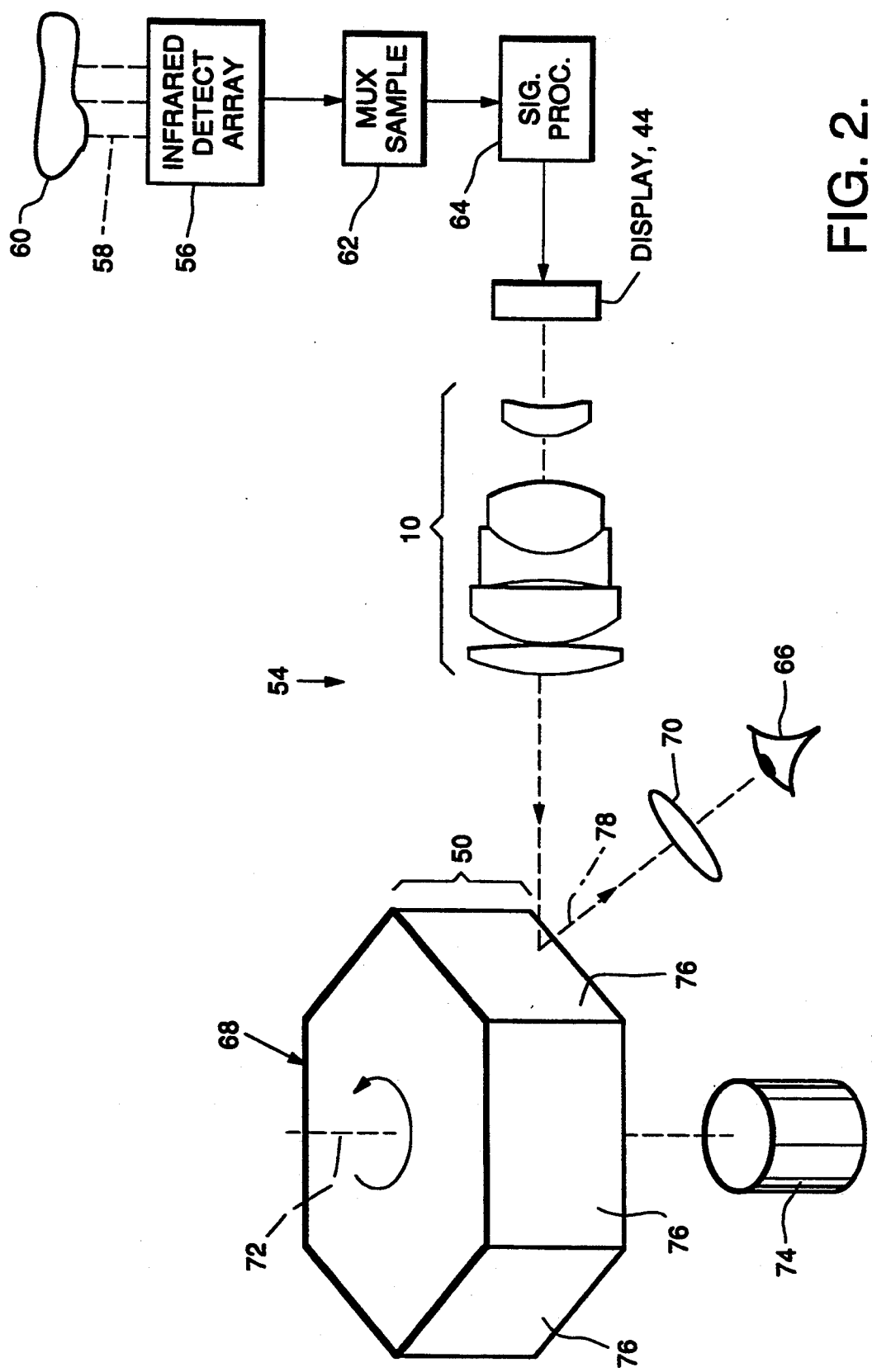
FIG. 2 is a simplified stylized view of an optical system for scanning a display for viewing by a person, the optical system including the collimating lens of the present invention.

FIG. 2 shows, by way of example, an optical system 54 which advantageously employs the collimating lens 10. The system 54 comprises an infrared detector array 56 which views radiation 58 emanating from a subject 60. Electric signals are produced by detectors of the array 56 in response to incident rays of the radiation 58. The electrical signals are multiplexed and sampled by a sampling unit 62. The samples produced by the sampling unit 62 are in digital format and represent data of pixels of the subject 60. The system 54 further comprises a signal processor 64 and the aforementioned display 44. The signal processor 64 receives the signal samples from the sampling unit 62, and applies customary signal-processing technology, such as filtering and storing of the signal samples, to output image data of the subject 60 for presentation upon the display 44.

A person, represented by a human eye 66, views the display 44 by means of the collimating lens 10, a rotating mirror assembly 68 and a relay lens 70 which are positioned serially along an optical path between the display 44 and the eye 66. The relay lens 70 is located between the mirror assembly 68 and the eye 66. The collimating lens 10 is located between the mirror assembly 68 and the display 44. The mirror assembly 68 is rotated about an axis 72 by a motor 74. The mirror assembly 68 comprises a series of mirrors 76 located about a periphery of the assembly 68 and arranged symmetrically about the rotational axis 72. While one of the mirrors 76 may be oriented parallel to the rotational axis 72, the other mirrors 76 are angled slightly, with different angles of inclination, relative to the rotational axis 72 so as to reflect a beam 78 of light from the collimating lens 10 at a different angle relative to the rotational axis 72. Thereby, one mirror 76 directs an upper portion of the image presented in the display 44 to the eye 66, another mirror 76 directs a lower portion of the image on the display 44 to the eye 66, and the remaining mirror 76 direct intermediate regions, between the foregoing upper and lower regions of the image, to the eye 66. Thus, assuming that an image portion is swept by the mirror 76 from the person's left to the person's right, as viewed by the eye 66, successive mirrors 76 provide a scanning from top to bottom of the image on the display 44 to the eye 66.

As shown in FIG. 1, the rays 52 from a plurality of the LEDs 46 cross in the plane of the stop 50. If the distance between the display 44 and the collimating lens 10 were increased such that the rays propagating from the LEDs 46 to the collimating lens 10 were substantially parallel, then the foregoing crossover point of the rays 52 would move closer to the collimating lens 10, to appear at a distance substantially equal to the focal length of the collimating lens 10. In the situation depicted in FIG. 1. wherein the display 44 is sufficiently close to the fifth lens element 20 to permit collection of rays of radiation from the LEDs 46 over a wide angle of emergence of the rays, the aforementioned crossing over of the rays 52 occurs at a distance substantially greater than the focal length of the collimating lens 10. It is shown, by tracing the rays 52, that the width of a cone of light emitted by an LED 46 in the center of the display 44, and captured by the collimating lens 10, is limited by the stop 50 which is located at the external aperture of the collimating lens 10.

As shown in FIG. 2, the aperture stop 50 is formed by each of the mirrors 76 as each mirror 76 comes into position for reflecting the beam 78 from the collimating lens 10 to the relay lens 70. The physical size of each mirror 76 determines the physical dimensions of the stop 50. Thus, a larger mirror 76 permits the collection of a larger cone of rays emanating from an LED 46 for transmission to the eye 66. A smaller mirror 76 would decrease the conic angle of the cone of rays emanating from an LED 46 to be transmitted to the eye 66. The numerical ratio of the focal length of the collimating lens 10 to the nominal value of a diameter of the aperture stop 50 is referred to as the focal ratio and determines the amount of radiation emitted by the display 44 which is intercepted and collected by the lens 10 for transmission to the eye 66. The lens 10, the focal ratio has a value of 1.4 enabling for the collimating lens 10 described in connection with FIG. 1 to gather radiation emitted from an LED 46 lying in a cone having a vertex angle of approximately 40 degrees. Thereby, the collimating lens 10 provides for increased capacity for gathering light from the source of light, namely the array of the LEDs 46, while maintaining each of the mirrors 76 at a relatively small size. This aids in attaining a compact packaging for the major optical components of the system 54, namely the collimating lens 10 and the mirror assembly 68. In addition, the collimating lens 10 provides for high resolution of the image presented on the display 44, and provides for increased spectral bandwidth. As noted above, the use of spherical surfaces on all of the lens elements facilitates the manufacturing process because the lenses share a common axis. The construction of the collimating lens 10 provides for a telecentric pupil for maximizing reception of radiant energy emitted by the array of LED's 46.

The collimating lens 10 projects a viewing angle of 18 degrees, this being 9 degrees to a side of the central optic axis of the lens assembly. For viewing a square subject, the angles to the centers of the sides of the subject from the central axis are 6.4 degrees, and 9 degrees out to the corners of the square subject. With the foregoing construction, the lens 10 operates over a spectral band of 5200–6800 angstroms. The construction of the doublet lens element 24 improves the quality of an image produced by the collimating lens 10 by reducing chromatic aberrations which may be present in collimating lenses. The doublet lens element 24 furthermore corrects for chromatic dispersion which may be introduced by the other lens elements 12, 14, and 20. The curvature of the right surface 40 of the fifth lens element 20 may be altered, if desired, to accommodate a different spacing between the lens 10 and the display 44 from that disclosed above. A longer radius of curvature is provided for an increased spacing, and a shorter radius of curvature is provided for a decreased spacing, between the collimating lens 10 and the display 44.

In conclusion, the collimating lens 10 has improved light-collection ability, improved chromatic correction, is operable over a wider field of view, is operable over a bandwidth sufficiently large to encompass displays radiating in different colors over a relatively large portion of the spectrum, provides for a lower weight and physical size, and simplifies manufacture by avoidance of the need for a field lens element secured to a display being viewed.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A collimating lens assembly having an optical axis and comprising:
   a first lens group disposed along said optical axis at a first end of said assembly;
   a second lens group disposed along said optical axis at a second end of said assembly opposite said first end;
   a doublet lens element disposed along said optical axis between said first lens group and said second lens group;
   wherein said first lens group and said second lens group each comprise at least one singlet positive-power optical lens element;
   wherein said doublet lens element includes a first negative-power lens element and a second positive-power lens element, said first lens element having a higher index of refraction than said second lens element for chromatic correction of said collimating lens; and
   wherein said assembly is operative to form a telecentric pupil along said optical axis external to said second end of said assembly.

2. A lens assembly according to claim 1 wherein, in said doublet lens element, said first lens and said second lens have optical spherical surfaces of equal radii of curvature and are contiguous, said first lens element of said doublet lens element being closer to said first end of said assembly than said second lens element of said doublet lens element.

3. A lens assembly according to claim 1 wherein said first lens group comprises two positive-power lens elements disposed serially along said optical axis, and said second lens group has a single positive-power lens element.

4. A lens assembly according to claim 3 wherein the positive-power lens elements of said first lens group and said single positive-power lens element of said second lens group each have a first index of refraction, the index of refraction of said negative-power lens element of said doublet lens element being larger than said first index of refraction, and the index of refraction of said positive-power lens element of said doublet lens element being smaller than said first index of refraction.

5. A lens assembly according to claim 4 wherein in said doublet lens element, said negative-power and said positive-power lens elements have optical spherical surfaces of equal radii of curvature and are contiguous, said negative-power lens element of said doublet lens element being closer to said first end of said optical assembly than said positive-power lens element of said doublet lens element, said first lens element of said doublet lens element being cemented to said second lens element of said doublet lens element; and wherein all optical surfaces of said two lens elements of said first lens group and of said single lens element of said second lens group and of said lens elements of said doublet lens element are spherical.

6. A lens assembly according to claim 5 wherein
   said first end of said assembly is located from an aperture stop a distance greater than a focal length of said collimating lens; and wherein
   said single lens element of said second lens group has a concave optical surface facing said second end of said assembly for receipt of radiation from a radiant source located along said optical axis distant from said second end of said assembly.

7. A lens assembly according to claim 4 wherein
   said single optical element of said second lens group has a convex optical surface facing said doublet lens element;
   one lens element of said first lens group has two convex optical surfaces, and the other lens element of said first lens group has a convex optical surface and one convex optical surface facing said doublet lens element;
   said negative-power lens element of said doublet lens element has two concave optical surfaces of differing radii of curvature; and
   said positive-power lens element of said doublet lens element has two convex optical surfaces of differing radii of curvature.

8. A collimating lens assembly having a first end and a second end opposite said first end, said lens assembly comprising:
   a first group including first and second positive-power singlets having a first index of refraction, said first group being located at said first end of said assembly;
   a third positive-power singlet located at said second end of said assembly, said third singlet also having said first index of refraction; and
   a doublet disposed between said first group and said third singlet, said doublet including a positive-power lens having an index of refraction less than said first index, and a negative-power lens having an index of refraction greater than said first index
   wherein said assembly is operative to form a telecentric pupil along said optical axis external to said second end of said assembly.

9. The lens assembly of claim 8, wherein said first singlet is spaced apart from said second singlet, and wherein said negative-power lens has an optical flat that is abutted against said second singlet.

10. The lens assembly of claim 9 wherein all surfaces of said singlets and said doublet are spherical.

11. A system comprising:
    an optical display;
    a collimating lens assembly having opposing first and second ends, said first end being in optical communication with said display, said assembly including a first lens group located at said first end of said assembly and a second lens group located at said second end of said assembly, said first and second groups each including at least one positive-power singlet, said assembly further including a doublet disposed between said first and second groups; and
    scanning means, in optical communication with said second end of said assembly, for scanning said display.

12. The system of claim 11 wherein each lens in said first group is spaced apart from said display.

13. The lens assembly of claim 11 wherein said assembly is operative to form a telecentric pupil along an optical axis of said assembly, said pupil being external to said first end of said assembly.

14. The system of claim 11 wherein said scanning means includes a plurality of mirrors, said mirrors having a shape and size that defines an aperture stop for said assembly.

15. The system of claim 14 wherein said second end of said assembly is located from said aperture stop a distance greater than one focal length of said assembly.

16. The system of claim 15 wherein said singlets of said first and second groups have a first index of refraction, and wherein said doublet includes a positive-power lens element and a negative-power lens element, said positive-power lens element of said doublet having an index of refraction less than said first index, said negative-power lens element of said doublet having an index of refraction greater than said first index.

17. The lens assembly of claim 16, wherein said negative-power lens element has an optical flat, and wherein said first group includes a singlet that is abutted against said optical flat of said negative-power lens element.

* * * * *